Patented Jan. 27, 1953

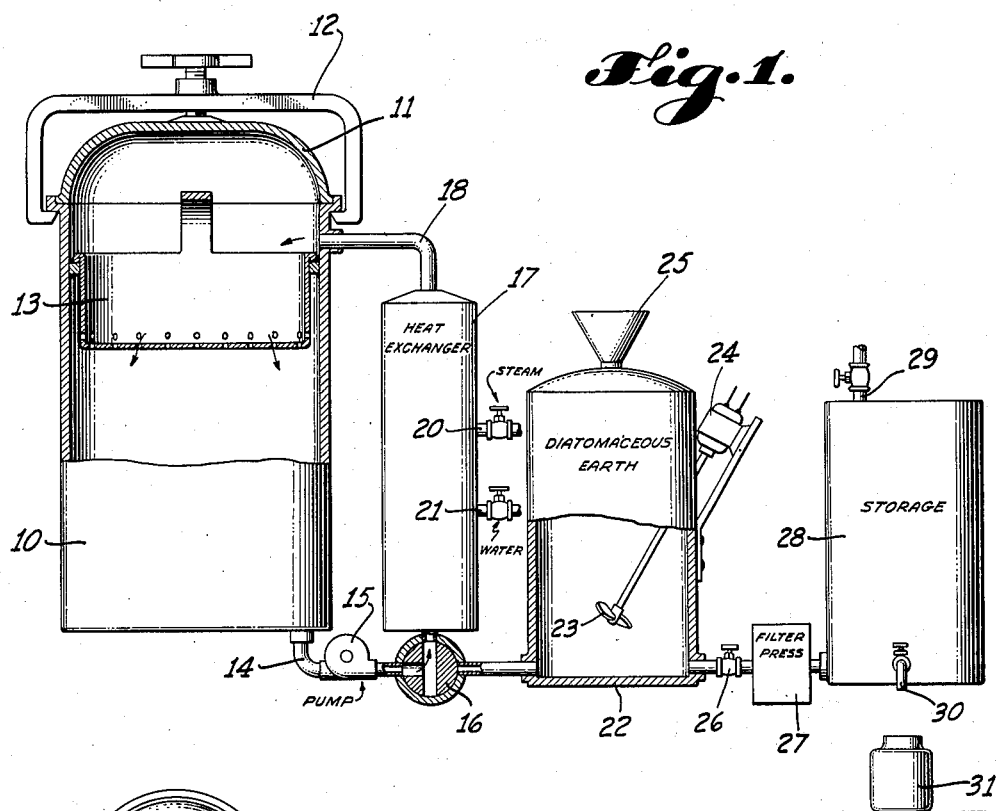
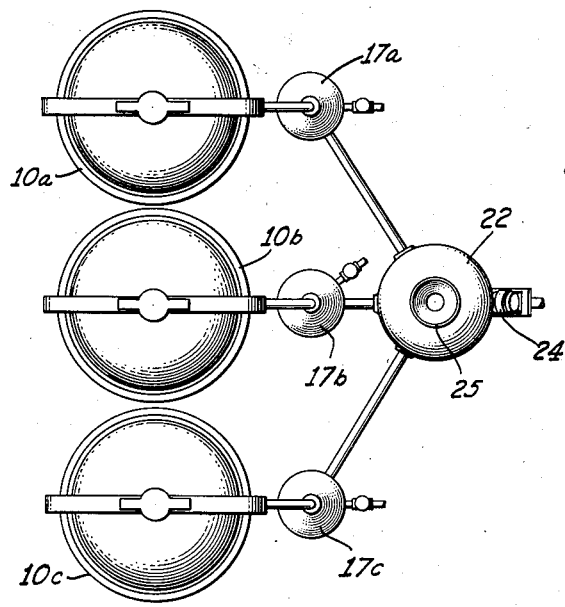

2,626,558

UNITED STATES PATENT OFFICE 2,626,558

METHOD OF PREPARING COFFEE

Jacob R. Stein, Beverly Hills, Calif.

Application January 7, 1949, Serial No. 69,680

4 Claims. (Cl. 99—71)

1

This invention relates to a method of preparing a coffee beverage and the resulting product.

A primary object of the invention is to provide a coffee brew which is so treated that it may be placed in jars or other hermetically sealed containers for future use and which is characterized by the fact that it may be kept indefinitely without becoming rancid or distasteful and without becoming cloudy or having sediments or precipitates deposit. The resulting product can consequently be heated at any time and will not only be clear but will have a flavor comparable with freshly brewed coffee.

Another object of the invention is to provide an improved method of preparing coffee which will produce a product having the above mentioned desirable characteristics.

With the foregoing and other objects in view, which will be made manifest in the following detailed description and specifically pointed out in the appended claims, reference is had to the accompanying drawings for an illustrative embodiment of the invention, wherein:

Figure 1 is a schematic view of apparatus which may be employed in preparing the improved coffee beverage in accordance with the method embodied in the present invention; and Fig. 2 is a partial top plan view illustrating further details of the apparatus.

Referring to the accompanying drawings wherein similar reference characters designate similar parts throughout, there is disclosed in Fig. 1 a brewer or pressure cooker consisting of a vessel 10 having a cover 11 that may be retained in position on the vessel such as by a clamp 12 to retain pressure in the vessel. Within the top of the vessel there is suspended a perforated basket or container 13 in which roasted and ground coffee beans are placed. Near the bottom of the vessel 10 there is an outlet 14 leading to a pump 15 which, in turn, leads to a three-way valve 16 one outlet of which leads to a heat exchanger 17. An outlet 18 from the heat exchanger leads to a point near the top of the pressure vessel 10. The heat exchanger is supplied with a heating medium such as, for example, superheated steam through a steam pipe 20 and with a cooling medium such as through a water pipe 21. These pipes are equipped with valves so that the superheated steam or water may be optionally turned on or off.

The other outlet from the three-way valve 16 leads to a storage vessel 22 within which there is preferably an agitator or stirrer such as that indicated at 23 that may be operated by means of an electric motor 24. A filter aid, such as finely divided infusorial or diatomaceous earth, may be introduced into the storage receptacle 22 through a hopper or funnel 25. The outlet from this storage container leads through a valve 26 to a filter press 27, and the outlet from the filter press leads to a second storage vessel 28 to which an anti-oxidizing or sequestering agent may be admitted through a valve controlled inlet 29. The resulting product may be drawn from the storage vessel 28 through a valve controlled outlet 30 and discharged into jaws or containers one of which is indicated at 31 which, after being filled, are hermetically sealed.

In the preferred arrangement there are three brewers or pressure vessels indicated in Fig. 2 at 10a, 10b and 10c, each of which is equipped with its own heat exchanger, the heat exchangers being indicated at 17a, 17b, and 17c. All of these brewers or pressure vessels are equipped with their own pumps and discharge through their respective three-way valves into the storage vessel 22. By using three brewers, one brewer may be discharging into the storage vessel 22 while another brewer is undergoing the coffee brewing operation, and the third is being prepared for brewing.

The improved method is performed substantially as follows: Assuming that the brewer 10 is designed to contain and have circulated therethrough approximately 42½ gallons of water, I place approximately 16 pounds of finely ground roasted coffee beans in the basket or container 13. The pump 15 is started to operating to bring about a circulation from the vessel 10 through the heat exchanger 17 and back to the vessel 10, and the superheated steam from the steam pipe 20 is supplied to the heat exchanger 17. The water thus circulated is brought to a boil while the container 10 is open or has its cover 11 removed so as to remove as much air or non-condensable gases as possible from the water. After the water has been brought to a boil with the cover 11 removed, the cover 11 is applied to the vessel 10 and locked in position by the clamp 12 so as to retain pressure within the vessel 10. The pressure within the vessel is then brought up to approximately 25 pounds per square inch above atmospheric and this pressure is maintained for approximately fifteen minutes. Other pressures may be selected between fifteen pounds per square inch and thirty pounds per square inch and the length of time during which the pressure is maintained may be adjusted accordingly. I find it highly advantageous to brew the coffee at superatmospheric pressure and at a temperature above that of normal boiling water.

When the brewing operation is completed the superheated steam supplied to the heat exchanger 17 is turned off and cold water is supplied to the heat exchanger through the water pipe 21 so as to quickly cool the brew as rapidly as is reasonably possible to approximately 190° F. When this temperature is reached the three-way valve 16 is turned and the pump 15 is utilized to pump the brew from the vessel 10 to the storage vessel 22. When the brew is in this vessel a filter aid in the amount of approximately eight ounces of blended infusorial or diatomaceous earth is added to the brew through the hopper or funnel 25. This blended filter aid consists of a blend of negatively charged and positively charged earth. Approximately twice as much positively charged earth is used as the negatively charged earth. This finely divided material is distributed throughout the coffee extract by means of the agitator or stirrer 23. The use of such a blend of positively and negatively charged diatomaceous earth I believe results in the removal of certain undesirable oils and resins, the negative earth being attractive to positively charged oils and the positive earth being attractive to negatively charged resins. From the vessel 22 the extract is conducted to the filter press 27 wherein the finely divided infusorial or diatomaceous earth forms a filter-pack, effectively filtering the coffee. While eight ounces of the above described filter aid is introduced into a 42½-gallon batch that is first produced, I find that after the first batch of coffee has been filtered through the filter press, the amount of filter aid added can be cut down to approximately four ounces per batch. Also, although other filtering means could be employed such as, for example, filter papers, I find that the results with filter papers are somewhat erratic and therefore a conventional filter press is preferred. The filtered extract or filtrate passes from the filter press 27 into the storage vessel 28 where an anti-oxidizing or sequestering agent is added through the inlet. A preferred anti-oxidizing agent is nordihydroguaiaretic acid which is added to the coffee in the storage receptacle 28 in a very small percentage. I use approximately one fluid ounce to a batch of 42½ gallons although this percentage is not critical in that it may be varied considerably. Other sequestering or anti-oxidizing agents may be substituted such as for example any of the sodium, potassium or cadmium salts of poly-amino carboxylic acid. Sodium poly-phosphate may also be employed and these sequestering or anti-oxidizing agents are added when used in approximately the same proportions as the nordihydroguaiaretic acid. It will be understood that the temperature of the coffee, when it reaches the vessel 28, is approximately 190° F. as there is very little loss of temperature involved while the coffee is in the receptacle 22 or while it is passing through the filter press. If the coffee is cooled below or heated above 190° F., a larger quantity of the anti-oxidizing agent is usually required and while the anti-oxidizing agent could be introduced into the water in the brewing vessel 10 a larger quantity would have to be added. If the temperature of the coffee in the receptacle 28 at the time that the sequestering agent is added varies from 190° F. it is normally advisable to return the coffee to that temperature before adding the sequestering agent.

From the receptacle 28 the coffee may be drawn and the jars or other containers 31 filled and hermetically sealed. The resulting product has a flavor comparable with that of freshly brewed coffee even though it has been stored in these jars or containers for a considerable length of time. In serving it is merely necessary to bring the coffee to a boil although it is sometimes desirable to boil it for a minute or two prior to serving. The coffee prepared in accordance with this method will keep indefinitely without becoming rancid and has the advantage that it will remain clear, that is, it does not become cloudy and sediments or precipitates do not form therein.

Various changes may be made in the details of construction without departing from the spirit and scope of the invention as defined by the appended claims.

I claim:

1. The method of preparing a coffee beverage which consists of brewing roasted and ground coffee and water at a pressure of approximately twenty-five pounds per square inch for fifteen minutes, quickly cooling the coffee to approximately 190° F., adding to the brew positively and negatively charged diatomaceous earth, filtering the brew, adding to the filtrate a small percentage of nordihydroguaiaretic acid, and packaging the product in hermetically sealed containers.

2. The product prepared as defined by claim 1.

3. The method of preparing a coffee beverage which consists of brewing roasted and ground coffee and water at a pressure of between 15 and 30 pounds per square inch for approximately fifteen minutes, quickly cooling the coffee to approximately 190° F., adding to the brew positively and negatively charged diatomaceous earth, filtering the brew, adding to the filtrate a small percentage of a sequestering agent taken from the group consisting of nordihydroguaiaretic acid, sodium, potassium and cadmium salts of poly-amino carboxylic acid, and sodium poly-phosphate, and packaging the product in hermetically sealed containers.

4. The product prepared as defined by claim 3.

JACOB R. STEIN.

REFERENCES CITED

The following references are of record in the file of this patent:

UNITED STATES PATENTS

| Number | Name | Date |
| --- | --- | --- |
| 1,478,903 | Oldham | Dec. 25, 1923 |
| 2,071,011 | Wendt | Feb. 16, 1937 |
| 2,151,582 | Block | Mar. 21, 1939 |
| 2,230,031 | Fisher | Jan. 28, 1941 |
| 2,334,171 | Carter | Nov. 16, 1943 |
| 2,373,192 | Lauer | Apr. 10, 1945 |
| 2,375,550 | Grossman | May 8, 1945 |

FOREIGN PATENTS

| Number | Country | Date |
| --- | --- | --- |
| 302,332 | Great Britain | Sept. 26, 1929 |
| 389,192 | Canada | June 4, 1940 |